United States Patent [19]
Saito et al.

[11] Patent Number: 5,434,695
[45] Date of Patent: Jul. 18, 1995

[54] DYNAMIC PRESSURE BEARING AND ROTARY POLYGON MIRROR DEVICE WITH THE BEARING

[75] Inventors: Susumu Saito; Junshin Sakamoto; Makoto Kurosawa; Takahiro Kikuchi; Satoru Wada; Kenichi Kugai, all of Ibaraki, Japan

[73] Assignee: Hitachi Koki Co., Ltd., Tokyo, Japan

[21] Appl. No.: 48,185

[22] Filed: Apr. 20, 1993

[30] Foreign Application Priority Data

Apr. 21, 1992 [JP] Japan ................ 4-101366
Apr. 27, 1992 [JP] Japan ................ 4-107739
Jan. 29, 1993 [JP] Japan ................ 5-013649

[51] Int. Cl.6 ................................ G02B 26/10
[52] U.S. Cl. ........................ 359/200; 359/196; 359/197; 359/212; 359/217
[58] Field of Search ............ 359/200, 196, 197, 212, 359/217, 223, 225, 226

[56] References Cited

U.S. PATENT DOCUMENTS

| | | | |
|---|---|---|---|
| 4,512,626 | 4/1985 | Kamiya et al. | 359/200 |
| 4,623,216 | 11/1986 | Sato et al. | 359/200 |
| 4,934,781 | 6/1990 | Kato et al. | 359/200 |
| 4,934,836 | 6/1990 | Tanaka et al. | 359/200 |

FOREIGN PATENT DOCUMENTS 53-6854 3/1978 Japan .
59-164413 9/1984 Japan .

Primary Examiner—Joseph A. Popek
Assistant Examiner—Huan Hoang
Attorney, Agent, or Firm—Sughrue, Mion, Zinn, Macpeak & Seas

[57] ABSTRACT

A rotary polygon mirror device comprises: a rotor including a polygon mirror secured to one end face of a cylinder, a central rod secured inside said cylinder in such a manner that the central rod is extended along the axis of the cylinder, and a thrust bearing magnet secured to the end face of the central rod, said magnet; and a casing coaxially surrounding the cylinder with a gap therebetween. In the device, the gap provides radial bearing means, and the cylinder and the casing are made equal in thermal expansion coefficient.

17 Claims, 5 Drawing Sheets

DYNAMIC PRESSURE BEARING AND ROTARY POLYGON MIRROR DEVICE WITH THE BEARING

BACKGROUND OF THE INVENTION

1. Field of the Invention

This invention relates to rotary polygon mirror devices, and more particularly to a rotary polygon mirror device which employs a dynamic pressure air bearing for rotating its rotary polygon mirror.

2. Description of the Related Art

For instance in a laser beam printer, the laser beam must be accurately deflected at high speed. In order to meet this requirement, a rotary polygon mirror is employed. A rotary polygon mirror is in the form of a regular polyhedron with mirrors on its sides. The rotary polygon mirror is fixedly mounted on the rotor of a drive motor, so that it is rotated at high speed. Therefore, a rotary polygon mirror rotated at a speed of lower than 15,000 rpm employs a ball bearing, and a rotary polygon mirror rotated at a speed higher than 15,000 rpm employs a fluid bearing utilizing air or magnetic fluid, or a fluid bearing in combination with a magnetic bearing (cf. Japanese Patent Application Publication No. 6854/1978, and Japanese Patent Application (OPI) No. 164413/1984 (the term "OPI" as used herein means an "unexamined published application")).

In one example of the fluid bearing, herring bone or spiral grooves are formed in the surface of the rotor or in the surface of a member confronted through a small gap with the rotor, and a fluid drawing phenomenon due to the rotation of the rotor or the confronted member is utilized to produce a high pressure. In another example, such as a movable pad type fluid bearing, a plurality of pads are arranged around the rotor which can be freely tilted, in such a manner that small gaps are locally formed, and high dynamic pressures produced there are utilized.

In any of the bearing systems, the rotation in vibration cannot be obtained unless the gap is maintained most suitable. Of those bearing systems, the dynamic pressure groove system has a small range of tolerable gap dimension, several micro-meters ($\mu$m) to several tens of micro-meters ($\mu$m). Hence, in forming the bearing, it is necessary to use a material such as a ceramic or a special alloy which is not highly affected in dimension by thermal variation and is wear resistant. However, the use of such material provides another problem that it is difficult to form spiral grooves or the like in the component of the bearing. This increases the manufacturing cost.

Furthermore, in the case where, in order to increase the bearing rigidity, a viscous fluid other than air is employed in the dynamic pressure groove system, the polygon mirror is limited in range of speeds. That is, when the polygon mirror is turned at high speed, a windage loss or bearing loss occurs to increase the temperature, as a result of which the bearing characteristic becomes unstable, and therefore the allowable range of speeds of the polygon mirror is limited.

The movable pad type air bearing operates stably over a relatively wide range of temperature variations. However, it is intricate in construction and accordingly high in manufacturing cost.

FIG. 1 is a sectional view of a conventional polygon mirror rotating motor. As shown in FIG. 1, a polygon mirror 105 and a rotor 106 are mounted on a rotating body 104. When current is applied to a stator 107, the rotor 106 is rotated in the direction of the arrow A. As the rotating body turns, it draws the air around it, so that the rotating body 104 and upper and lower bearings 101 are spaced from each other. Each of the upper and lower bearings 101 comprises: a bearing base 102; and a wear-resisting plastic member 103 bonded to the bearing base 102.

The shaft of the motor is held vertical, and its thrust end supporting the whole weight of the rotating body 104 is floated by the force of repulsion induced between two permanent magnets 108 and 109 which are set with the same poles.

Thus, the motor is in a non-contact state both in the radial direction and in the thrust direction. Therefore, when the motor is turned at high speed, it should rotate smoothly; however, in practice, it vibrates. There are some causes for the vibration of the motor. One of the causes is the imbalance of the rotating body. This cause may be eliminated by detecting the imbalance of the rotating body 104 with a balance tester. Another cause of the vibration is the bearings. In this case, the vibration cannot be eliminated with the tester.

More specifically, the vibration may attributed to the fact that the upper and lower bearings 101 are not coaxial, or to the configuration of those bearings 101. In the case where the upper and lower bearings 101 are not coaxial, the vibration occurs as follows: That is, the rotating body 104 is turned with its rotating axis tilted because of the misalignment of the bearings 101, so that the gap between the rotating body 104 and the bearings 101 becomes non-uniform, thus causing the vibration. In order to eliminate the misalignment of the bearings 101, heretofore the following method is employed: That is, the position of one of the bearings 101 is adjusted with screws in three directions until it aligns with the other bearing 101.

The vibration attributing to the configuration of the bearings 101 is called "whirl vibration". It has been considered that the whirl vibration can be eliminated by using a bearing 101 having an inner surface which is made up of a plurality of circular-arc surfaces as shown in FIG. 2 or 3. However, in practice, the vibration cannot be eliminated even with such a bearing. This will be described in more detail.

As shown in FIG. 2 or 3, the gap between the rotating body 104 and the bearing 101 is gradually decreased in the direction of rotation. As the rotating body 104 is turned, the gas in the gap is drawn viscously by the relative movement of the surfaces; that is, the gas is pushed in the gap, thus producing a pressure (or positive pressure) to float the rotating body 104. Thereafter, the gap is gradually increased in the direction of rotation of the rotating body 104. In this case, the viscosity of the gas produces a pressure (or negative pressure) to pull the rotating body 104. As a result, while the rotating axis rotates with an angular speed $\omega$, the rotating body 104 turns around the center of the bearing 101 in the direction of rotation of the rotating axis with a radius corresponding to an amount of eccentricity e and with a swirling angular speed $\omega_0$. The swirling angular speed $\omega_0$ is $\frac{1}{2}$ to $\frac{1}{3}$ of the angular speed $\omega$.

Furthermore, the vibration may be caused when the gap between the rotating body 104 and the bearings 101 is changed with temperature. This is due to the fact that the rotating body 104 is different from the bearings 101 in thermal expansion coefficient. This will be described in more detail below.

Heretofore, the bearing base 102 is made of copper or plastic material, and the rotating body 104 is made of iron or steel. When the rotating body 104 is turned, the temperature is increased, and, since the thermal expansion coefficient of the bearing base 102 is higher, the inside diameter of the latter is increased by thermal expansion more than the diameter of the rotating body 104, so that the gap therebetween is increased. Hence, the dynamic pressure is decreased while the rigidity is lowered, so that vibration occurs.

On the other hand, if, in the case where the wear-resisting plastic member on the bearing base 102 is relatively thick, the plastic member is smaller in thermal expansion coefficient than the bearing base 102, then the gap is increased similarly as in the above-described case. However, when the plastic member is equal to or larger than the bearing base 102 in thermal expansion coefficient, then the gap is decreased, so that the bearing loss is increased, and the temperature rises greatly.

As was described above, the conventional dynamic pressure bearing is disadvantageous in that it will vibrate the rotating body 104 unstably. The vibration attributing to the misalignment of the two bearings 101 can be eliminate by adjusting the positions of the bearings 101 so that they are coaxial with each other. However, this method provides another problem that the adjustment required time and labor, and the number of components is increased.

When the speed of rotation is increased, the energy loss is increased: that is, the temperature rises, so that the bearing gap is varied, with the result that the vibration is produced. Hence, it is difficult to increase the speed of rotation to a high value (20,000 rpm or higher). In order to overcome this difficulty, it is necessary to externally cool the bearing 101, and accordingly the motor.

SUMMARY OF THE INVENTION

Accordingly, an object of this invention is to eliminate the above-described difficulties accompanying a conventional rotary polygon mirror device.

More specifically, an object of the invention is to provide a dynamic pressure bearing and a rotary polygon mirror device using the bearing, which is simple in construction, and operates stably over a wide range of high speeds, and is low in cost.

The foregoing object and other objects of the invention have been achieved by the provision of a rotary polygon mirror device comprising: a rotor including a polygon mirror secured to one end face of a cylinder, a central rod secured inside the cylinder in such a manner that the central rod is extended along the axis of the cylinder, and a magnet secured to the end face of the central rod, the magnet forming thrust bearing means, and a stationary casing which substantially coaxially surrounds the cylinder with a gap therebetween; in which, according to the invention, the gap provides radial bearing means, and the cylinder and the stationary casing are equal in thermal expansion coefficient.

In the device of the invention, the bearing gap is maintained unchanged even when the bearing means and the rotor change in temperature, and the bearing means and the rotor can be efficiently cooled when the polygon mirror is rotated at high speed. Furthermore, when the polygon mirror is started or stopped, the bearing surfaces are prevented from being worn out by being brought into contact with each other. Thus, the device is able to operate stably for a long period of time.

Also, the foregoing object and other objects of the invention have been achieved by the provision of a dynamic pressure bearing comprising: a bearing base, and a wear-resisting member bonded to the inner surface of the bearing base which surface confronts with a rotating body, in which, according to the invention, the wear-resisting member has a predetermined bearing configuration.

In order to prevent the misalignment of the bearing, both in the case where it has a plurality of bearing surfaces, and in the case where the bearing surface is wide along the axis of rotation, a single bearing base is employed, and the wear-resisting plastic members are bonded to the inner surface of the bearing base, and are machined simultaneously to have the predetermined bearing configuration.

Therefore, the bearing surfaces thus formed are in alignment with each other, and the resultant bearing is free from misalignment.

In order to suppress the occurrence of whirl vibration in the case where the bearing surface is made up of a plurality of circular-arc surfaces, it is essential to eliminate the negative pressure. For this purpose, the bearing is so set that the bearing surface surrounds a part of the rotating body substantially coaxially, and it is so shaped that the gap between the surface and the rotating body is decreased gradually in the direction of rotation of the rotating body, and changed abruptly from a minimum value to a maximum value at predetermined positions. Therefore, in the gap, the air viscosity is lost quickly, and therefore no negative pressure is produced. However, if the ratio of the minimum value to the maximum value is excessively small, then the negative pressure is liable to be formed when the rotating body turns at high speed. Thus, in order to turn the rotating body stably, it is desirable to set the ratio to at least six (6).

In the bearing, the gap is increased abruptly. Therefore, the bearing is free from the difficulty that the gap is gradually increased to produce negative pressure. However, as the difference between the minimum gap and the maximum gap is decreased, the negative pressure is liable to be produced, and therefore the ratio of the maximum gap to the minimum gap should be at least six (6).

Further, the foregoing object and other objects of the invention have been achieved by the provision of a rotary polygon mirror device comprising: a rotating body with a polygon mirror; a fluid dynamic pressure bearing which surrounds a part of the rotating body in such a manner that the bearing is substantially coaxial with the rotating body, and has a wear-resisting member formed on the inner surface thereof which is confronted with the rotating body, the part of the rotating body being a passageway for the magnetic flux of an electric motor formed therein, in which, according to the invention, the inner surface of the bearing, which is confronted with the rotating body, is such that the gap between the surface and the rotating body is gradually decreased in the direction of rotation of the rotating body, and increased abruptly at predetermined positions.

The rotary polygon mirror device dispenses with a troublesome adjusting operation such as alignment, and is free from the whirl vibration.

In the bearing of the device, the bearing base is made of the same material as the rotating body, and the wear-resisting member formed on the inner surface of the bearing base is smaller in thickness than the bearing base, which contributes to stabilization of the temperature withstanding characteristic of the device.

In order to improve the temperature withstanding characteristic, it is desirable that the wear-resisting member is 0.5 mm or less in thickness.

Furthermore, in the bearing, the bearing base is equal in thermal expansion coefficient to the rotating body, and therefore the gap is maintained constant regardless of temperature variation. In addition, the wear-resisting plastic member bonded to the bearing base is small in thickness, and therefore the bearing is less affected by the thermal expansion of the plastic member.

The bearing is secured directly to the housing, so as to be cooled effectively.

The nature, principle, and utility of the invention will be more clearly understood from the following detailed description of the invention when read in conjunction with the accompanying drawings.

BRIEF DESCRIPTION OF THE DRAWING(S)

In the accompanying drawings,

FIG. 1 is an explanatory diagram showing the arrangement of a conventional polygon mirror rotating motor;

FIGS. 2 and 3 are sectional views showing examples of a conventional dynamic pressure bearing;

FIG. 4 is a vertical sectional view showing an example of a rotary polygon mirror device, which constitutes a first embodiment of this invention;

Figure 7A:
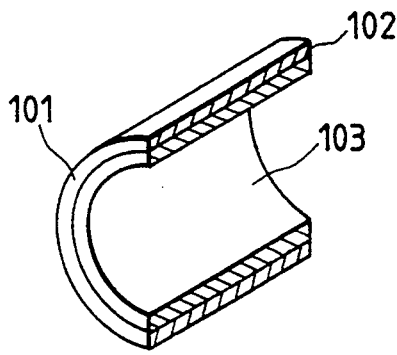
Figure 7B:
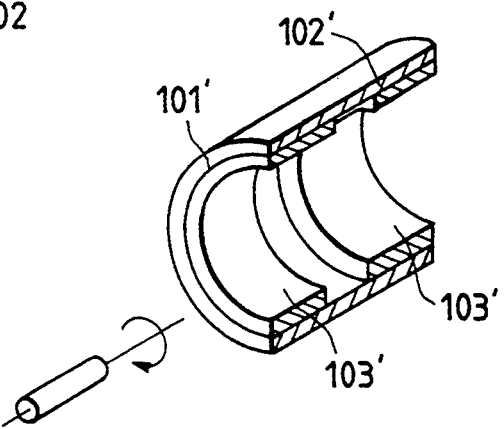
Figure 8:
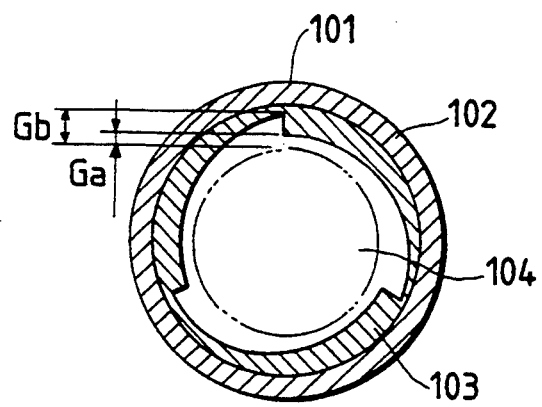
Figure 9:
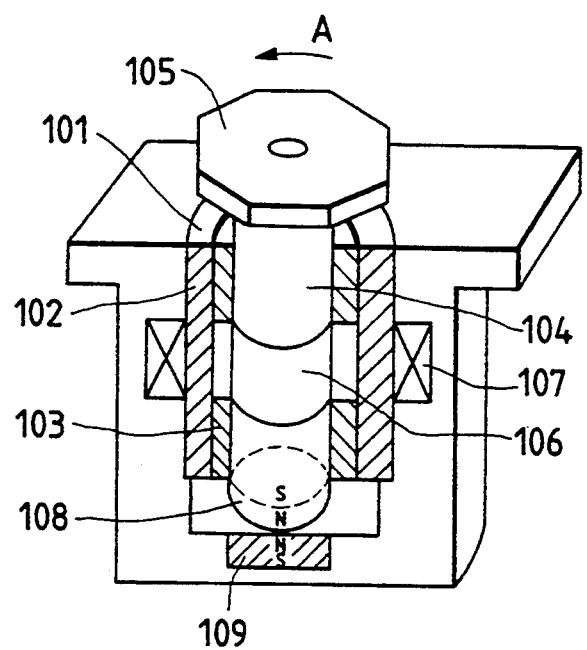
Figure 10:
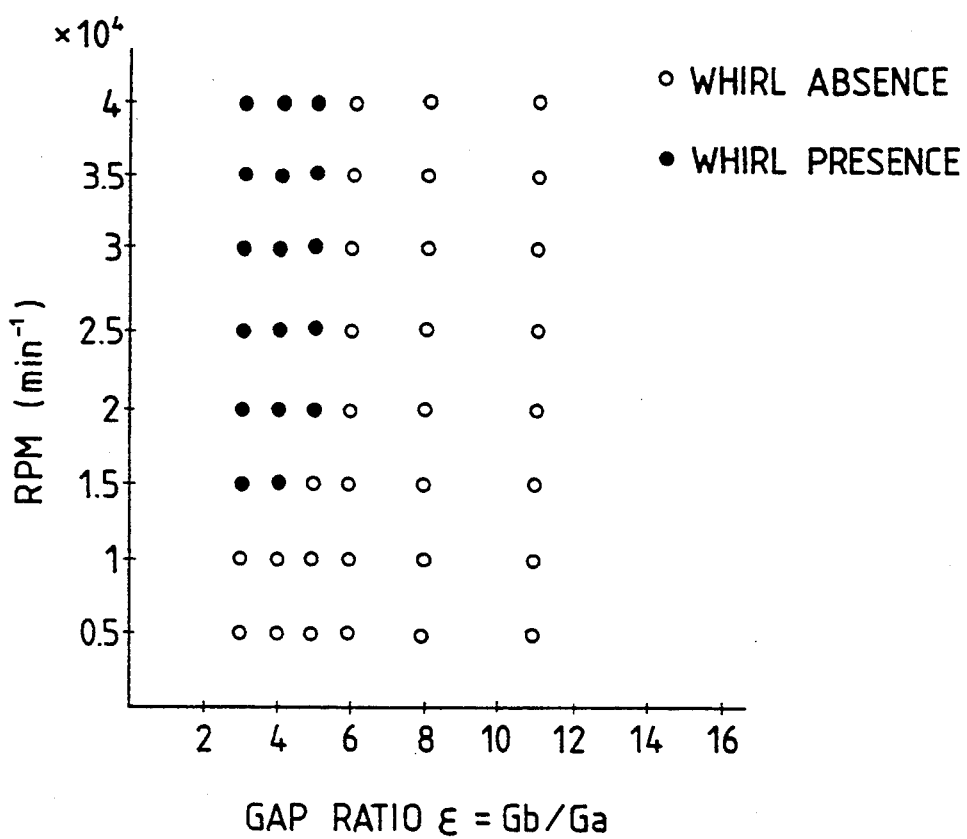
Figure 11:
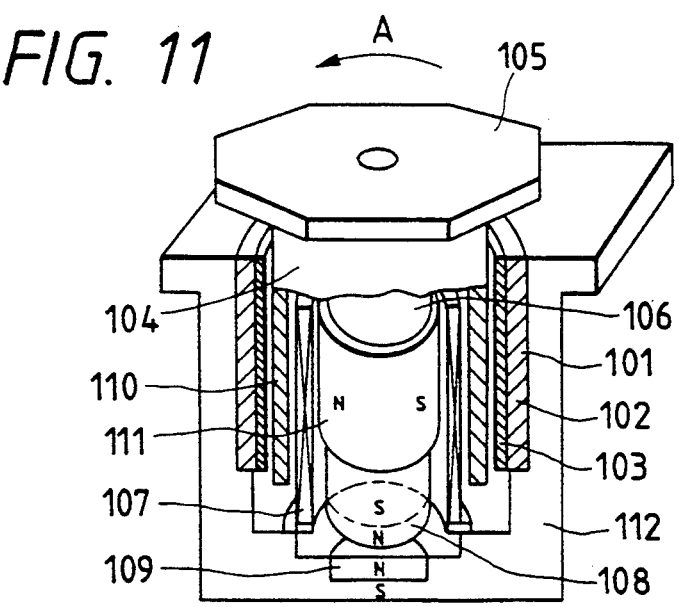
Figure 12:
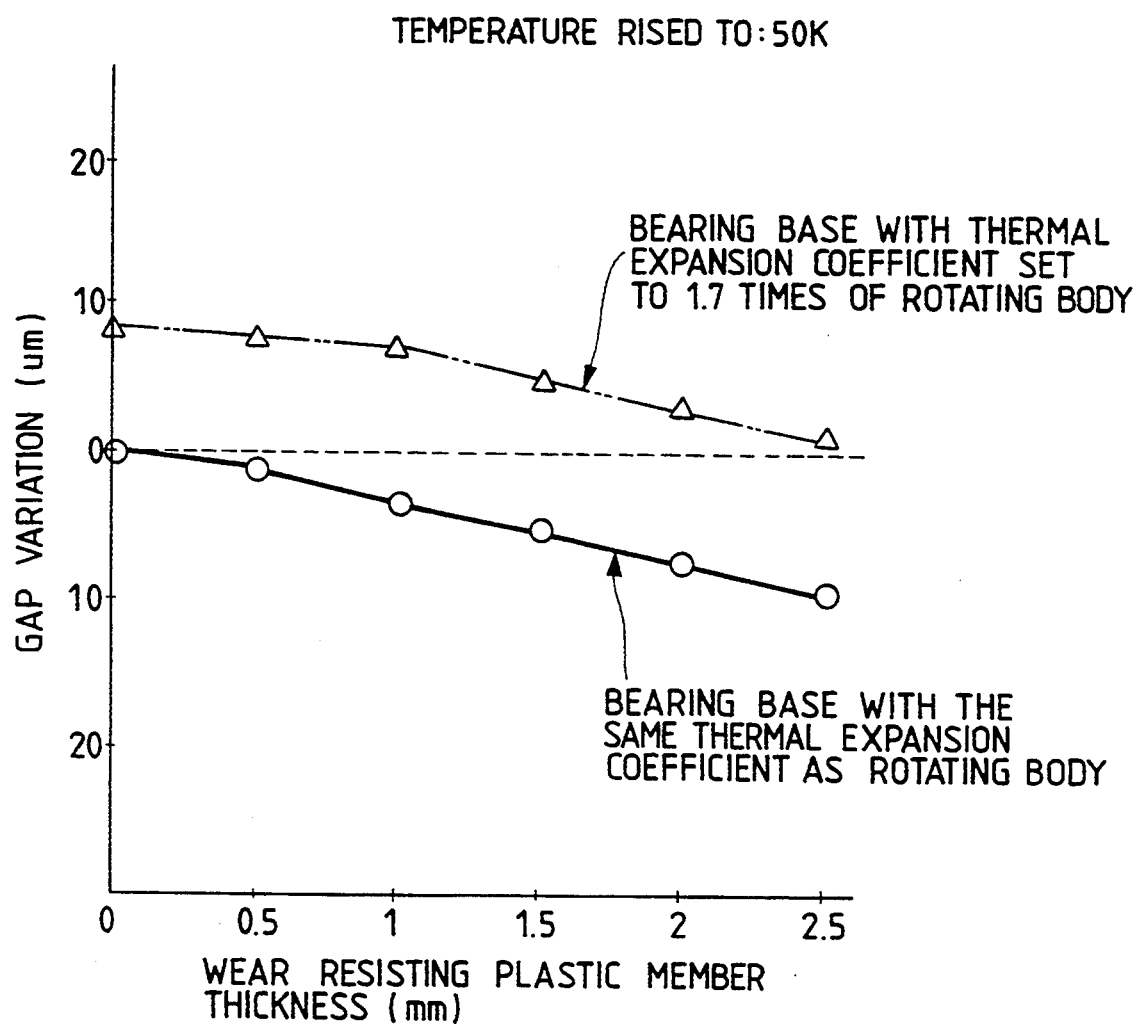

FIGS. 7(a) and 7(b) are sectional perspective views of a dynamic pressure bearing according to a third embodiment of this invention, respectively;

FIG. 8 is a cross-sectional view of the dynamic pressure bearings shown in FIGS. 7(a) and 7(b);

FIG. 9 is an explanatory diagram showing the arrangement of a polygon mirror rotating motor with the dynamic pressure bearing according to the invention;

FIG. 10 is a graphical representation indicating how whirl vibration occurs when the gap ratio of the dynamic pressure bearing is changed;

FIG. 11 is an explanatory diagram showing the arrangement of the polygon mirror rotating motor according to a fourth embodiment of the invention; and FIG. 12 is a graphical representation indicating variations in gap of the bearing with variations in thickness of the plastic member of the bearing.

DETAILED DESCRIPTION OF THE PREFERRED EMBODIMENTS

Preferred embodiments of this invention will be described with reference to the accompanying drawings.

An example of a rotary polygon mirror device, which constitutes a first embodiment, as shown in FIG. 4, comprises a rotary cylinder 1, and a regular polyhedron 2 with mirrors on its sides which is secured to one end of the rotary cylinder 1 with a retaining screw 13. The cylinder 1 has a central rod 3 along its central axis. Magnets 6 forming drive motor means are secured to the central rod 3, and a permanent magnet 4 is fixedly bonded to the end face of the central rod 3.

The rotary cylinder 1 is accommodated in a stationary external housing which is made up of a head cover 10 having light going-in-and-out windows (not shown), a side casing 11, and an end casing 12.

An air-core type stator coil 8 is secured to the end casing 12 in such a manner that it is confronted with the motor magnets 6 inside the rotary cylinder 1, and is coaxial with the magnets 6 with a certain gap therebetween. The stator coil 8 forms a part of the drive motor means.

A permanent magnet 5 is positioned in the inner surface of the end casing 12 at the center. The permanent magnet 5 and the permanent magnet 4 of the central rod 3 form thrust bearing means.

Figure 5:
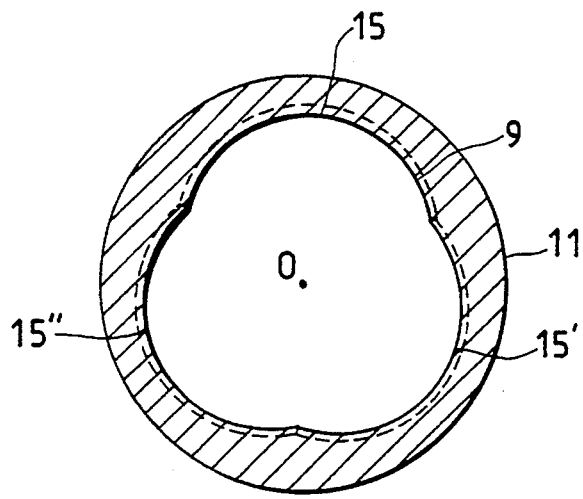
FIG. 5 is a cross sectional view of a side casing in the device of the invention.

The rotary cylinder 1 is set in the side casing 11 in such a manner that there is a small gap of the order of 10 to 100 μm between the inner surface 9 of the side casing 11 and the outer surface 7 of the rotary cylinder 1. The outer surface of the rotary cylinder 1 is cylindrical, and the inner surface of the side casing 11 is as shown in FIG. 5. More specifically, the inner surface of the side casing 11 consists of multiple-circular-arc surfaces 15, 15′ and 15″, thus forming dynamic pressure radial bearing means which is stable in rotation, and shows a high bearing rigidity.

In formation of the dynamic pressure radial bearing means, the gap 14 between the bearing and the bearing surface is an indispensable factor. As for the gap, there is a most suitable value with which the rotation is made stable with respect to the dimensions of the bearing and the aimed speed of rotation.

When the polygon mirror is rotated at high speed, the temperatures of the rotary cylinder 1 and the side casing 11 are increased greatly by the windage loss and the bearing loss of the polygon mirror. In the device of the invention, in order to maintain the bearing gap unchanged against the above-described temperature increase, the cylindrical portion of the rotary cylinder 1 and the side casing 11 are made of materials which are equal in thermal expansion coefficient. On the other hand, in order to improve the performance of rotation of the motor, it is desirable that the rotary cylinder 1 be made of a material high in magnetic permeability. In addition, in the drive motor means of the rotary polygon mirror device, the magnets 6 are secured to the rotary cylinder 1. Therefore, with the efficiency of the motor taken into consideration, it is unnecessary to use silicon steel or electromagnetic soft iron for the rotary cylinder and the side casing. Hence, in the embodiment, the rotary cylinder 1 and the side casing 11 are made of a structural steel.

Furthermore, when the polygon mirror is started or stopped, the rotary cylinder 1 may be brought into contact with the side casing 11, thus wearing out the bearing surfaces. In order to eliminate this difficulty, it is preferable to form a wear-resisting layer on the outer surface of the rotary cylinder 1 and/or the inner surface of the side casing 11. For this purpose, in the embodiment, a polyimide resin layer is formed on the inner surface 9 of the side casing 11. In order to prevent the rotary cylinder from rusting, the surface of the rotary cylinder 1 may be plated with nickel or chromium.

In the above-described embodiment, the bearing means has its base on the casing, and therefore the bearing means can be cooled with high efficiency. Accordingly the temperature rise of the rotary cylinder 1 can be effectively prevented.

In the above-described embodiment, the bearing surfaces, which are non-circular-arc surfaces, are formed in the inner surface of the side casing 11. However, the non-circular-arc surfaces may be formed in the outer surface of the rotary cylinder 1. Furthermore, the wear-resisting layer on the bearing surfaces may be formed by using other wear-resisting resin such as fluoro-resin. In addition, the wear-resisting layer may be formed by plating the surface with suitable metal, or may be a carbon film.

Figure 6:
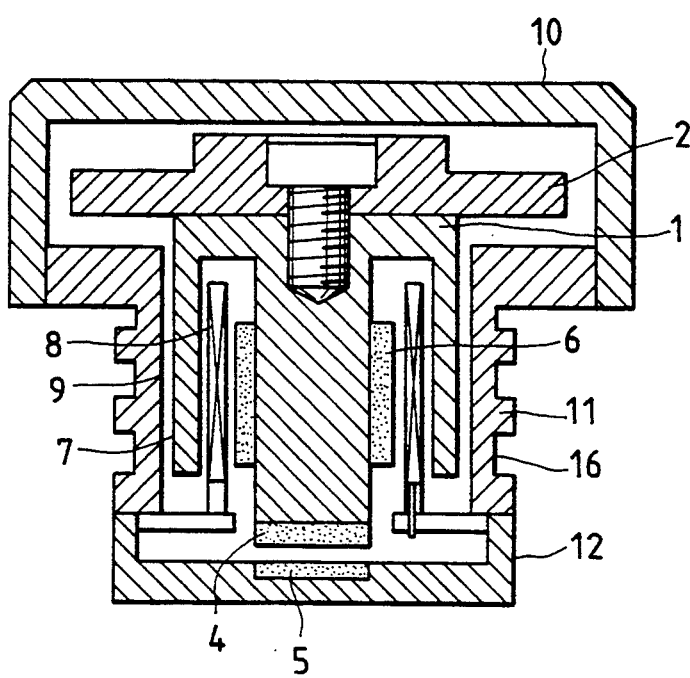
FIG. 6 is a vertical sectional view showing a modification of the rotary polygon mirror device, which constitutes a second embodiment of the invention.

FIG. 6 shows one modification of the rotary polygon mirror device, which constitutes a second embodiment of the invention. In the modification, in order to cool the bearing means more positively, cooling fins 16 are formed on the outer cylindrical surface of the side casing 11. Those fins 16 act to prevent the temperature rise of the bearing means and the rotary cylinder 1, whereby the predetermined bearing gap is maintained, and the wear-resisting layer is held unchanged in characteristic.

A dynamic pressure bearing according to a third embodiment of the invention is as shown in FIGS. 7(a), 7(b) and 8.

The bearing 101, as shown in FIG. 7(a), comprises: a bearing base 102 made of a hard material; and a wear-resisting member, namely, a plastic member 103 bonded to the inner surface of the bearing base 102 with adhesive. More than one plastic member may be employed as shown in FIG. 7(b). The inner surface of the plastic member 103, as shown in FIG. 8, is made up of a plurality of circular-arc surfaces. The inner surface of the plastic member 103 is formed with the bearing base held, for instance, on an NC machine. In the case of the bearing shown in FIG. 7(b), the two plastic members 103' are machined simultaneously.

FIG. 9 shows a polygon mirror motor using the bearing shown in FIGS. 7(a), 7(b) and 8. A polygon mirror 105 and a rotor 106 are mounted on a rotating body 104. A stator 107 is set around the bearing 101. When current is applied to the stator 107, the rotor 106 is turned in the direction of the arrow A. As the rotor 106 is turned, the bearing 101 and the rotating body 104 are placed in a non-contact state, being spaced apart from each other. In this case, the plastic members 103 of the bearing 101 are coaxial. Hence, the rotating body is prevented from being vibrated by the misalignment of the upper and lower bearings. That is, it is unnecessary to adjust the bearings for alignment.

FIG. 10 shows how the whirl vibration occurs, in which the horizontal axis represents ratios ($=G_a/G_b$) of minimum gaps $G_a$ to maximum gaps $G_b$, and the vertical axis represents numbers of revolutions per minute. As is apparent from FIG. 10, when the air gap ratio is smaller than six (6), the whirl vibration occurs when the speed is in a particular range; whereas when it is equal to or larger than six (6), no whirl vibration occurs with any speed. In this connection, the presence or absence of the whirl vibration is determined as follows: A vibration meter is connected to a dynamic pressure bearing under test. When, under this condition, the meter measures a vibration the frequency of which is lower than that of the vibration produced in the primary rotation (a vibration having a frequency of 200 Hz being produced when the rotating body is turned at a speed of 12,000 rpm), it is determined that the whirl vibration is present.

The bearing base 102 may be made of non-magnetic material such as aluminum or copper, or magnetic material such as steel.

The plastic member 103 may be made of polyimide resin, polyamide resin, or polyacetal resin. Of those materials, the polyimide resin is most suitable because it is high both in hardness and in wear resistance.

In bonding more than one plastic member 103 to the inner surface of the bearing base 101, those plastic members 103 should be moved along the axis of the bearing 101. In this case, the plastic members are set coaxial with each other, forming a step therebetween, and therefore the rotating body can be turned stably. In addition, since more than one plastic members 103 can be machined simultaneously, the bearing is improved in manufacturing efficiency as much.

FIG. 11 shows a polygon mirror rotating motor using the bearing shown in FIGS. 7(a), 7(b) and 8 according to a fourth embodiment of this invention.

As shown in FIG. 11, a polygon mirror 105 and a rotor 106 are mounted on a rotating body 104. The rotor 106 comprises a dipole permanent magnet 111 for generating magnetic flux, and a yoke 110 made of magnetic material through which the magnetic flux spreads. A coil 107 is fixedly secured between the permanent magnet 111 and the yoke 110. Current is applied to the coil 107 to turn the rotating body 104.

The outer cylindrical surface of the yoke 110 is confronted with the bearing 101. As the rotating body 104 is turned in the direction of the arrow A, it is spaced from the bearing 101 owing to the structure of the latter 101. Since the bearing is shaped as shown in FIG. 8, the rotating body 104 can be turned smoothly even at a high speed.

The bearing base 102, and the yoke 110 of the rotor 106 are made of one and the same material. Therefore, even when heat is generated by the high speed rotation of the rotating body, the gap between the bearing 101 and the rotor 106 is maintained unchanged.

In the bearing 101, the wear-resisting plastic member 103 bonded to the bearing base 102 is made as small in thickness as possible, so that it may not be affected by the thermal expansion.

FIG. 12 shows how the gap varies when the plastic material is changed thickness, in which the horizontal axis represents variations in thickness of the wear-resisting plastic member, and the vertical axis represents variations of the gap. More specifically, in FIG. 12, the curve indicated by the two-dot chain line is for the case where the rotating body is larger in thermal expansion coefficient than the bearing base, whereas the curve indicated by the solid line is for the case where the rotating body is equal in thermal expansion coefficient to the bearing base.

As is seen from FIG. 12, in the case where the thickness of the plastic member 103 is set to 0.5 mm or less, the gap is less affected by heat. In this case, the variation of the gap is 1 $\mu$m or less, and the energy loss is small, so that the rotating body is turned stably. The same effect may be obtained when, in the case where the thermal expansion coefficient of the bearing base 102 is set 1.7 times that of the yoke 110, the thickness of the plastic member 103 is set to 2.5 mm (as seen from the curve indicated by the two-dot chain line). However, this method is not preferable, because the material cost is increased. Thus, the thickness of the plastic member 103 should be in a range of from 0.1 to 0.5 mm.

In the polygon mirror rotating motor shown in FIG. 11, the bearing 101 is secured directly to the housing 12 so as to effectively radiate the heat which is generated by the high speed rotation.

As was described above, in the device of the invention, the bearing means and the rotor confronted with the latter are made of the same material, so that they are equal in thermal expansion coefficient. Further in the device, the bearing means, being provided by the casing, is effectively cooled. Thus, the bearing gap, which is one of the important factors in forming an air bearing, can be held stable against the variations of temperature, and therefore the polygon mirror is stable in performance over a wide range of high speeds. In addition, the material of the base of the bearing means may be a structural steel, and therefore a rotary polygon mirror low in manufacturing cost and high in performance can be realized according to the invention.

As was described above, the wear-resisting members, namely, the plastic members bonded to the bearing base are machined simultaneously to have a plurality of circular arc surfaces. Therefore, the bearing is high in alignment; that is, it is unnecessary to adjust the bearing. Furthermore, since the ratio of the maximum gap to the minimum gap is set to at least six (6), the bearing will not vibrate the rotating body.

In addition, in the bearing, the bearing base is made of the same material as the rotating body, and the plastic members bonded to the bearing base are smaller in thickness than the bearing base, and the bearing is secured directly to the housing. Hence, the bearing gap is varied less even when the temperature changes.

Thus, the rotary polygon mirror device according to the invention operates stably over a wide range of speeds. It goes without saying that the technical concept of the invention can be effectively employed for provision of other high speed and high precision rotating structures.

While the invention has been described in connection with the preferred embodiments, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A rotary polygon mirror device, comprising:
   a cylinder;
   a rotor including a polygon mirror secured to one end face of said cylinder;
   a central rod secured inside said cylinder and extended along the axis of said cylinder;
   thrust bearing means comprising a first magnet secured to an end face of said central rod; and
   a rigid stationary casing which substantially coaxially surrounds said cylinder to define a gap therebetween;
   wherein said gap serves as radial bearing means, and said cylinder and said stationary casing are equal in thermal expansion coefficient.

2. A device as claimed in claim 1, further comprising rotation drive means which includes:
   magnets secured to the outer surface of said central rod substantially at a middle portion of said central rod;
   a stator coil arranged coaxially in a space defined by said central rod and the inner cylindrical surface of said cylinder, said stator coil being secured to an end portion of said stationary casing; and
   said thrust bearing means further comprising a second magnet secured to the end portion of said casing to be coaxial with said first magnet;
   wherein said cylinder and said central rod are made of a magnetic permeable material.

3. A device as claimed in claim 1, wherein at least a part of said casing which is confronted with the outer cylindrical surface of said cylinder, is made of the same material as said cylinder.

4. A device as claimed in claim 1, further comprising a wear-resisting layer formed on the inner cylindrical surface of said casing which forms a gap with the outer cylindrical surface of said cylinder, said wear-resisting layer having a surface consisting of a series of multiple-circular-arc surfaces.

5. A device as claimed in claim 4, wherein said wear-resisting layer is made of a polyimide resin.

6. A dynamic pressure bearing for use in a rotary polygon mirror device, comprising:
   a bearing base; and
   a wear-resisting member bonded to the inner surface of said bearing base a surface of said wear-resisting member confronts with a rotating body of said rotary polygon mirror device to define a gap between said wear-resisting member and said rotating body;
   wherein said wear-resisting member has a predetermined configuration to allow said gap to serve as bearing means wherein the inner surface of said wear-resisting member is defined by a plurality of circular-arc surfaces which are discontinuously connected to each other so that said gap between said surface and said rotating body is gradually decreased in the direction of rotation of said rotating body, and changed from a minimum value to a maximum value abruptly at predetermined positions, the ratio of the maximum value to the minimum value being in a range of from 6 to 11.

7. A dynamic pressure bearing as claimed in claim 6, wherein said wear-resisting member is made of polyimide resin.

8. A dynamic pressure bearing as claimed in claim 6, wherein said wear-resisting member is at most 0.5 mm. in thickness.

9. A dynamic pressure bearing as claimed in claim 6, wherein at least two wear-resisting members are bonded to the inner surface of one bearing base, said wear-resisting members being machined simultaneously to have said predetermined configuration.

10. A rotary polygon mirror device, comprising:
    a rotating body with a polygon mirror; and
    a fluid dynamic pressure bearing which surrounds a part of said rotating body in such a manner that said bearing is substantially coaxial with said rotating body, and has a wear-resisting member formed on the inner surface thereof which is confronted with said rotating body, said part of said rotating body being a passageway for the magnetic flux of an electric motor formed therein;
    wherein the inner surface of said bearing, which is confronted with said rotating body, is defined by circular arc surfaces which are discontinuously connected to each other and which have a radius of curvature which is larger than a maximum radius of said inner surface so that the gap between said surface and said rotating body is gradually decreased in the direction of rotation of said rotating body, and increased abruptly at predetermined positions.

11. A rotary polygon mirror device as claimed in claim 10, wherein said bearing is secured directly to a housing.

12. A rotary polygon mirror device as claimed in claim 10, wherein said bearing comprises: a bearing base made of the same material as said rotating body; and a wear-resisting member formed on the inner surface of said bearing base, and said wear-resisting member is smaller in thickness than said bearing base.

13. A rotary polygon mirror device as claimed in claim 12, wherein said wear-resisting member is at most 0.5 mm in thickness.

14. A rotary polygon mirror device comprising:
a rotating body with a polygon mirror; and
a fluid dynamic pressure bearing which surrounds a part of said rotating body in such a manner that said bearing is substantially coaxial with said rotating body, and has a wear-resisting member formed on the inner surface thereof which is confronted with said rotating body, said part of said rotating body being a passageway for the magnetic flux of an electric motor formed therein;
wherein the bearing surface of said bearing, which is confronted with said rotating body, is defined by circular arc surfaces which are discontinuously connected to each other and which have a radius of curvature which is larger than a maximum radius of said inner surface so that the gap between said surface and said rotating body is gradually decreased in the direction of rotation of said rotating body, and increased abruptly at predetermined positions, and a plurality of said bearing surfaces are formed in the inner surface of one bearing base.

15. A rotary polygon mirror device as claimed in claim 14, wherein said bearing comprises: a bearing base made of the same material as said rotating body; and a wear-resisting member formed on the inner surface of said bearing base;
wherein said wear-resisting member is smaller in wall thickness than said bearing base.

16. A rotary polygon mirror device as claimed in claim 15, wherein said wear-resisting member is at most 0.5 mm in wall thickness.

17. A rotary polygon mirror device as claimed in claim 14, wherein said bearing is secured directly to a housing.

* * * * *